US012679153B2

(12) United States Patent
Quiroz

(10) Patent No.: US 12,679,153 B2
(45) Date of Patent: Jul. 14, 2026

(54) AUXILIARY WHEEL ASSEMBLY

(71) Applicant: Anner Quiroz, Long Beach, CA (US)

(72) Inventor: Anner Quiroz, Long Beach, CA (US)

( * ) Notice: Subject to any disclaimer, the term of this patent is extended or adjusted under 35 U.S.C. 154(b) by 0 days.

(21) Appl. No.: 18/953,282

(22) Filed: Nov. 20, 2024

(65) Prior Publication Data

US 2026/0138403 A1 May 21, 2026

(51) Int. Cl.
*B60D 1/48* (2006.01)
*B60S 9/14* (2006.01)

(52) U.S. Cl.
CPC ............... *B60D 1/486* (2013.01); *B60S 9/14* (2013.01)

(58) Field of Classification Search
CPC .................................... B60S 9/14; B60B 30/02
See application file for complete search history.

(56) References Cited

U.S. PATENT DOCUMENTS

| | | | |
|---|---|---|---|
| 1,108,690 A | 8/1914 | Brewster | |
| 1,372,813 A | 3/1921 | Helseth | |
| 1,446,448 A | 2/1923 | Vatter | |
| 2,593,692 A * | 4/1952 | Orelind | B60D 1/486 |
| | | | 280/157 |
| 3,851,855 A * | 12/1974 | Douglass | F16H 25/20 |
| | | | 384/615 |
| 3,879,058 A | 4/1975 | Horn | |
| 4,032,245 A * | 6/1977 | Woodruff | F16B 2/065 |
| | | | 403/385 |

| | | | |
|---|---|---|---|
| 4,055,222 A * | 10/1977 | Runte | E02F 3/7677 |
| | | | 172/418 |
| 4,083,574 A | 4/1978 | Massey | |
| 4,846,484 A | 7/1989 | Nekola | |
| D314,935 S | 2/1991 | Collins | |
| 5,813,687 A * | 9/1998 | Lay | B62D 21/09 |
| | | | 280/475 |
| 5,860,728 A * | 1/1999 | Maglica | F16M 11/2078 |
| | | | 362/396 |
| 6,086,083 A * | 7/2000 | Wilks | B60D 1/36 |
| | | | 280/511 |
| 6,962,369 B2 | 11/2005 | Hellums | |
| 7,407,151 B2 * | 8/2008 | Rabska | B60S 9/14 |
| | | | 254/345 |
| 8,523,148 B2 * | 9/2013 | Beck | B60S 9/22 |
| | | | 280/475 |
| 9,592,861 B2 * | 3/2017 | Fontenot | B62D 43/04 |
| 2007/0228348 A1 * | 10/2007 | Rabska | B60P 3/1066 |
| | | | 254/420 |

(Continued)

FOREIGN PATENT DOCUMENTS

| | | | | |
|---|---|---|---|---|
| AU | 2013299961 A1 * | 3/2015 | ............. | B60G 11/10 |
| BR | PI1002374 B1 * | 1/2018 | | |

(Continued)

*Primary Examiner* — Nicole T Verley

(57) ABSTRACT

An auxiliary wheel assembly for temporarily replacing a broken wheel to facilitate transport of a vehicle includes a shaft having a bottom end and a top end. A wheel is rotatably coupled to the shaft. The wheel is positioned adjacent to the bottom end of the shaft. A coupler is coupled to the top end of the shaft. The coupler is designed to releasably secure the shaft to an axle of a vehicle. The shaft is designed to position the wheel beneath the vehicle to facilitate movement of the vehicle when the vehicle has an immobile wheel.

10 Claims, 7 Drawing Sheets

(56) References Cited

U.S. PATENT DOCUMENTS

| | | | | |
|---|---|---|---|---|
| 2008/0127620 A1* | 6/2008 | Marcinczyk | ......... | A01D 34/001 |
| | | | | 56/12.7 |
| 2013/0022434 A1* | 1/2013 | Uttech | .................... | B66F 9/065 |
| | | | | 414/495 |
| 2015/0132089 A1* | 5/2015 | Clanton | .................. | B60B 30/10 |
| | | | | 414/800 |
| 2015/0151576 A1* | 6/2015 | Grengs | ................ | B60B 29/002 |
| | | | | 414/428 |
| 2015/0175396 A1* | 6/2015 | Ivanchenko | ........... | B66F 9/122 |
| | | | | 414/664 |

FOREIGN PATENT DOCUMENTS

| | | | | | | |
|---|---|---|---|---|---|---|
| CA | 1310994 | | | 12/1992 | | |
| CN | 106335478 | A | * | 1/2017 | ............... | B60P 3/32 |
| EP | 2165893 | A2 | * | 3/2010 | .......... | B60B 33/045 |
| GB | 653754 | A | * | 5/1951 | ............ | B60D 1/486 |
| GB | 723787 | A | * | 2/1955 | ............ | B60D 1/488 |
| GB | 2521725 | B | * | 4/2017 | ............... | B60S 9/22 |
| SK | 501042013 | U1 | * | 10/2014 | ............... | B65G 1/02 |
| WO | WO-2021051207 | A1 | * | 3/2021 | .......... | B60B 33/066 |

* cited by examiner

10

42

16

18

18

20

14

AUXILIARY WHEEL ASSEMBLY

CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to towing devices and more particularly pertains to a new towing device for temporarily replacing a broken wheel to facilitate transport of a vehicle.

(2) Description of Related Art Including Information Disclosed Under 37 CFR 1.97 and 1.98

The prior art relates to towing devices. The typical towing device is a tow truck, which is used to move broken down or abandoned vehicles. There are a variety of different types of tow trucks, such as a hook and train tow truck, a wheel lift tow truck, and a flatbed tow truck. However, all of these tow trucks require that at least two wheels of the vehicle be functional. For example, the hook and train tow truck moves vehicles by attaching a hook to the vehicle's bumper and wrapping a chain around the vehicle's frame. Once the vehicle is secured to the hook and train tow truck, the front end of the vehicle is lifted upwards and the back end remains on the ground. Thus, the back wheels of the vehicle must be functional, or at least rotatable, to move the vehicle using the hook and train tow truck. The wheel lift tow truck operates very similarly, although it can be attached to either the front or the back of the vehicle. The flatbed tow truck requires moving the entire vehicle onto the platform trailer attached to the truck. If a wheel bearing on the vehicle is broken or frozen, none of these traditional tow trucks are particularly useful because the broken wheel bearing makes the wheels of the vehicle inoperable. Thus, there is a need in the art for a towing device which can temporarily replace a wheel of a vehicle when the wheel bearings are broken or frozen.

(h) BRIEF SUMMARY OF THE INVENTION

An embodiment of the disclosure meets the needs presented above by generally comprising a shaft having a bottom end and a top end. A wheel is rotatably coupled to the shaft. The wheel is positioned adjacent to the bottom end of the shaft. A coupler is coupled to the top end of the shaft wherein the coupler is configured to releasably secure the shaft to an axle of a vehicle. The shaft is configured to position the wheel beneath the vehicle to facilitate movement of the vehicle when the vehicle has an immobile wheel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
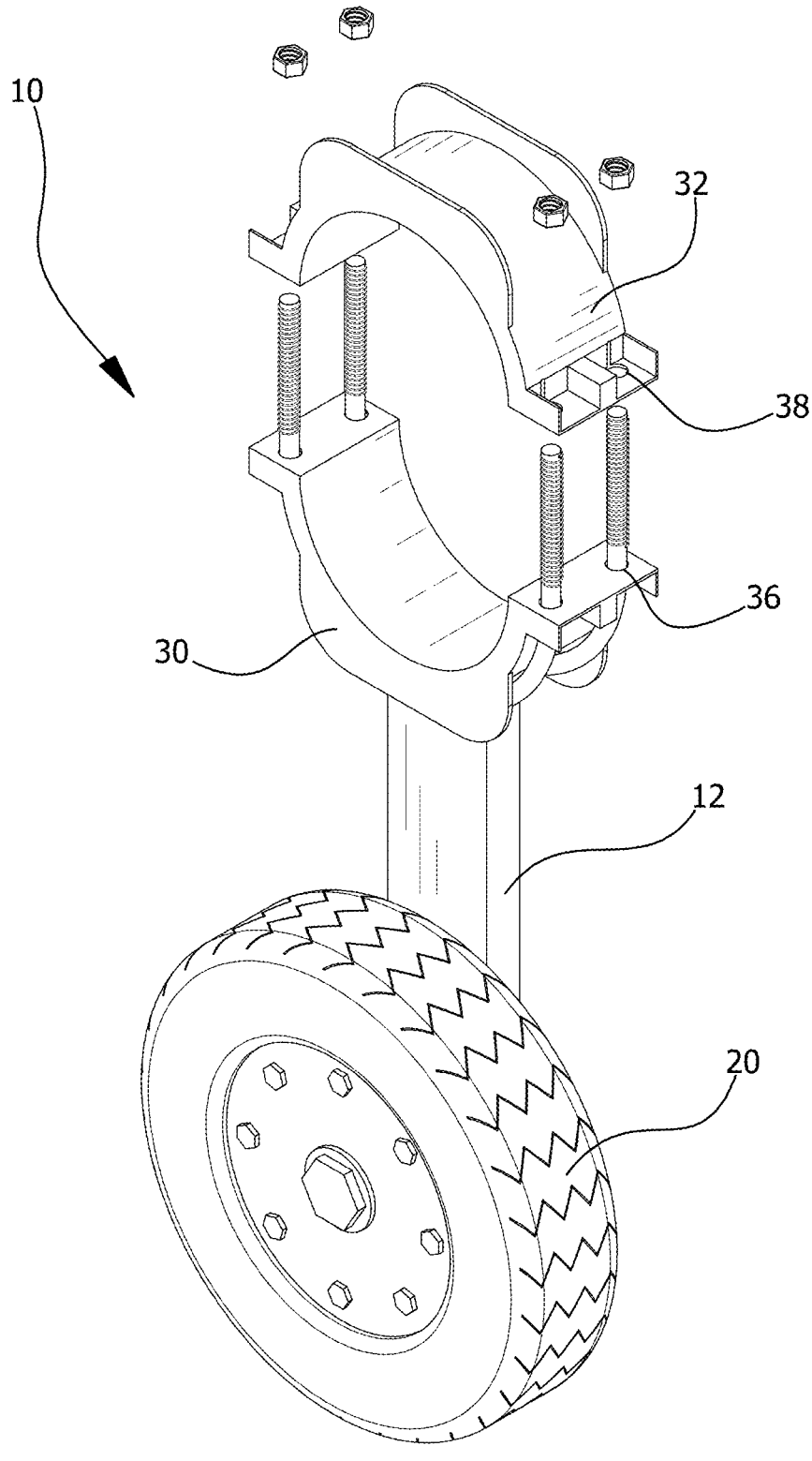
FIG. 1 is a front exploded view of an auxiliary wheel assembly according to an embodiment of the disclosure.
Figure 2:
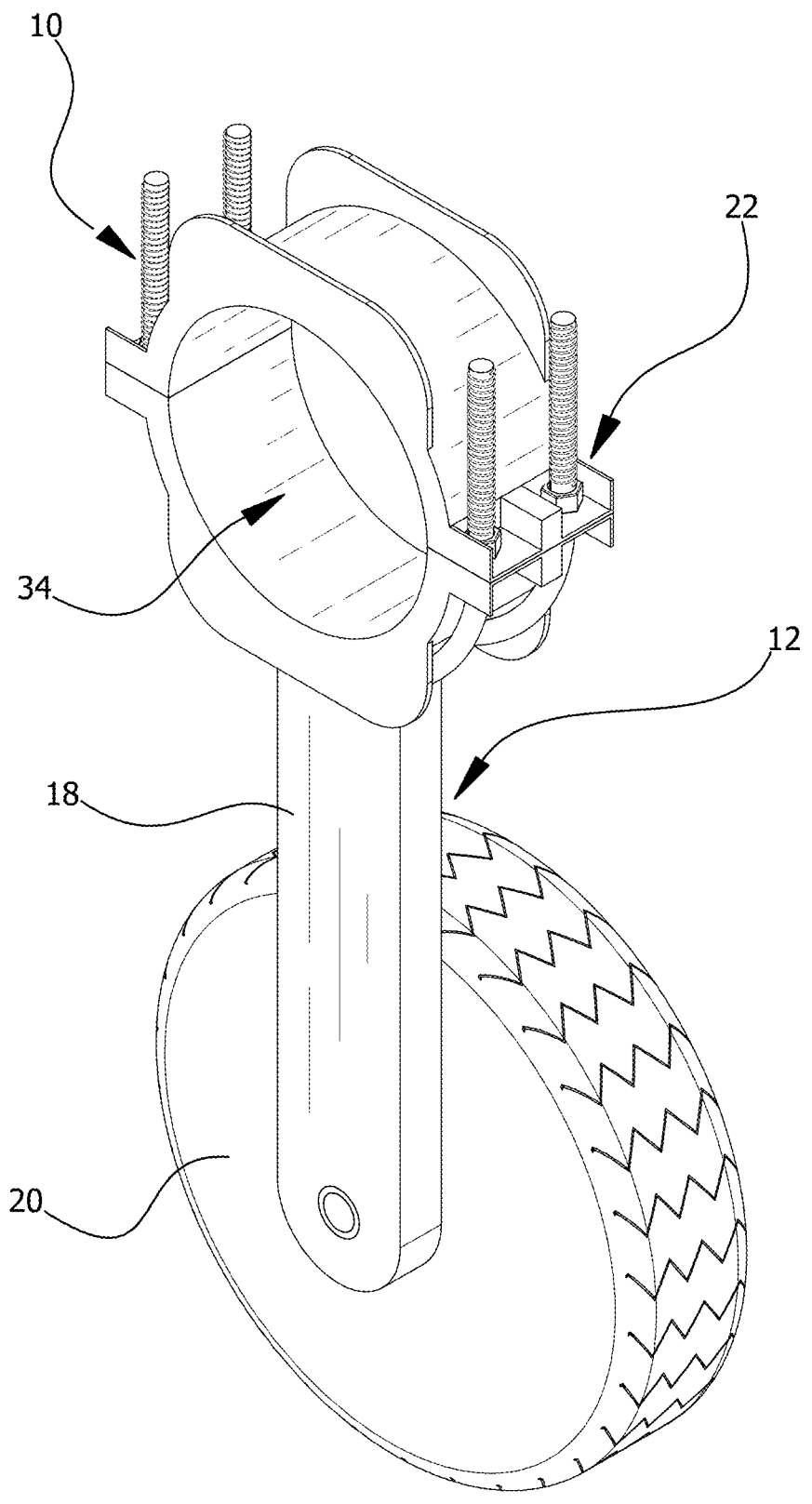
FIG. 2 is a rear perspective view of an embodiment of the disclosure.
Figure 3:
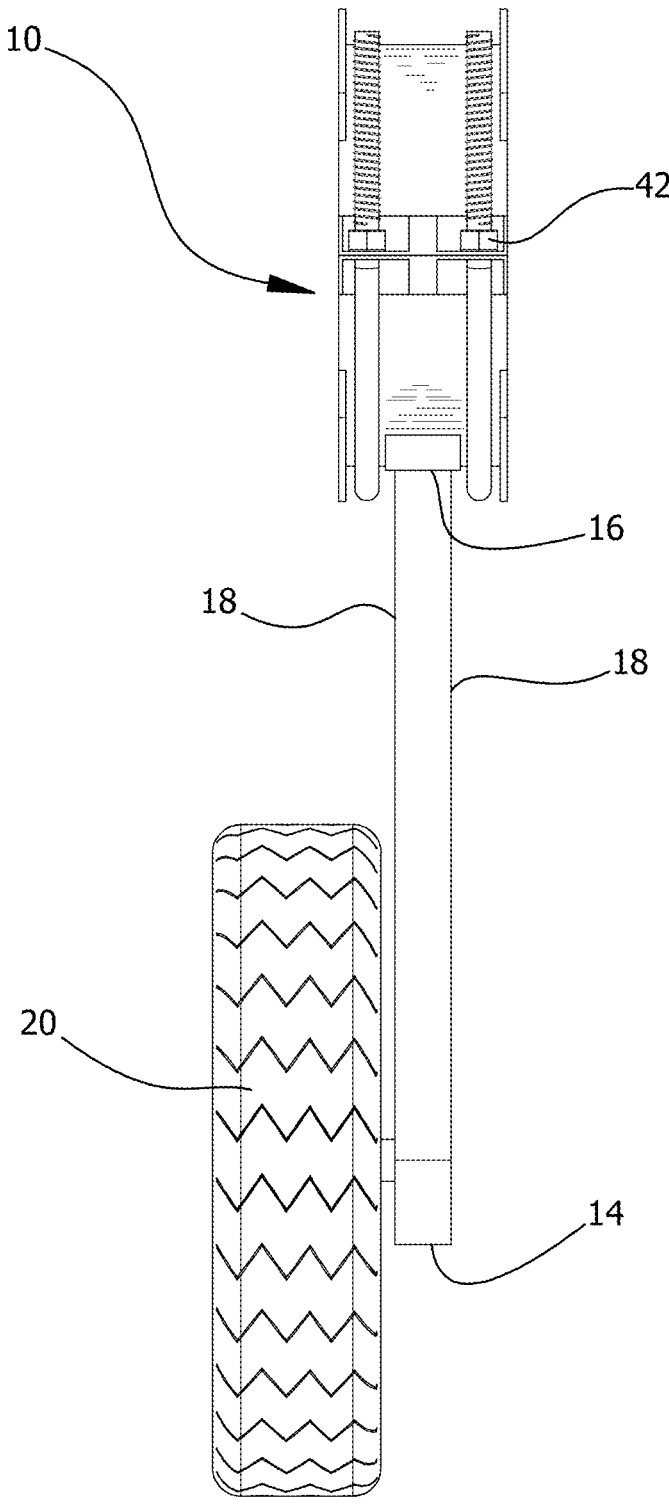
FIG. 3 is a side view of an embodiment of the disclosure.
Figure 4:
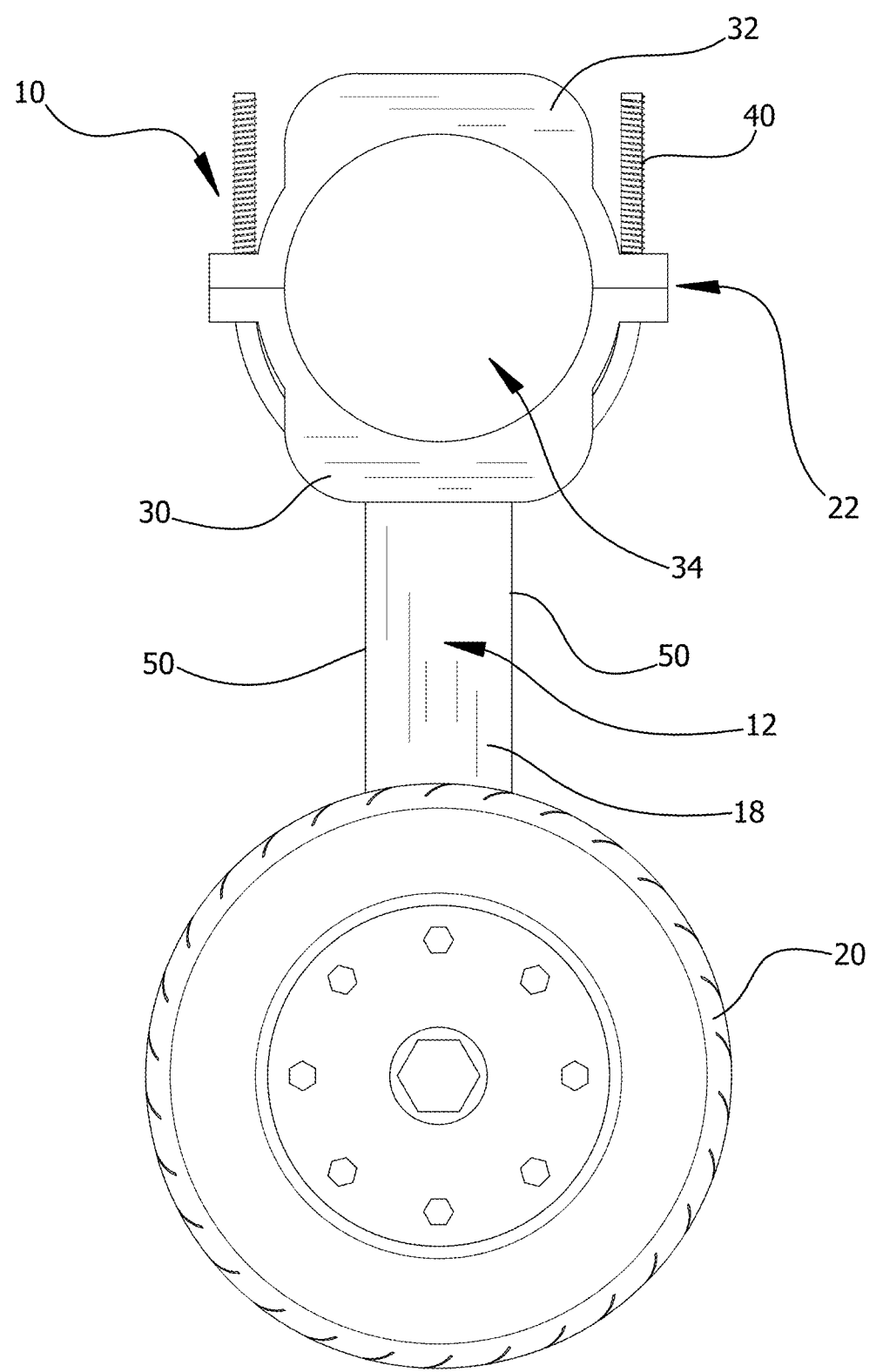
FIG. 4 is a front view of an embodiment of the disclosure.

With reference now to the drawings, and in particular to FIGS. 1 through 7 thereof, a new towing device embodying the principles and concepts of an embodiment of the disclosure and generally designated by the reference numeral 10 will be described.

As best illustrated in FIGS. 1 through 7, the auxiliary wheel assembly 10 generally comprises a shaft 12 having a bottom end 14 and a top end 16. The shaft 12 generally has a pair of opposing sides 18. Each opposing side of the pair of opposing sides 18 may be planar. The shaft 12 may be rectangular. For example, the shaft 12 is generally elongated between the bottom end 14 and the top end 16. The shaft 12 may be made from an iron material wherein the iron material is configured to withstand significant strain without breaking or deforming.

A wheel 20 is rotatably coupled to the shaft 12. The wheel 20 is generally positioned adjacent to the bottom end 14 of the shaft 12. For example, the wheel 20 may be positioned on a first side of the pair of opposing sides 18 of the shaft 12. The wheel 20 is generally parallel to the first side of the pair of opposing sides 18. In other words, the wheel 20 is rotatable about an axis that is perpendicular to the pair of opposing sides 18 of the shaft 12 such that the wheel 20 is movable along a plane that is parallel to the pair of opposing sides 18 of the shaft 12.

3

Figure 5:
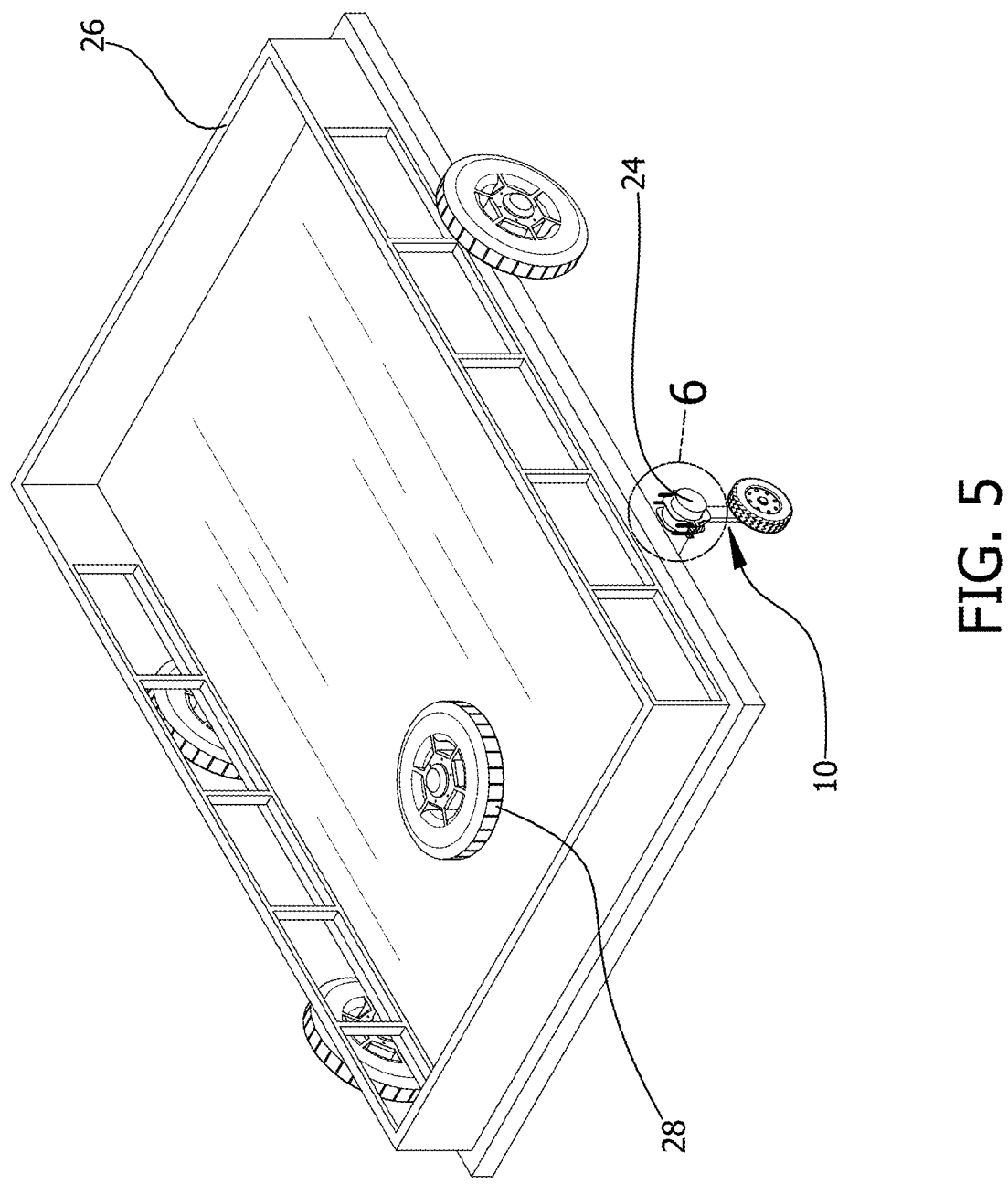
FIG. 5 is an in-use view of an embodiment of the disclosure.

A coupler 22 is coupled to the top end 16 of the shaft 12. The coupler 22 is configured to releasably secure the shaft 12 to an axle 24 of a vehicle 26 wherein the shaft 12 is configured to position the wheel 20 beneath the vehicle 26 to facilitate movement of the vehicle 26 when the vehicle 26 has an immobile wheel 28. For example, the vehicle 26 may be a trailer as shown in FIG. 5. The immobile wheel 28 may have a frozen or broken wheel bearing making the immobile wheel 28 inoperable. The support wheel assembly 10 is generally configured to replace the immobile wheel 28 to facilitate movement of the vehicle 26. The coupler 22 may be made from the iron material that is configured to withstand significant strain without breaking or deforming.

For example, the coupler 22 may include a first coupling member 30 that is attached to the top end 16 of the shaft 12. The first coupling member 30 generally extends outwardly from opposing lateral ends 50 of the shaft 12. For example, the first coupling member 30 may define a U-shape.

Figure 6:
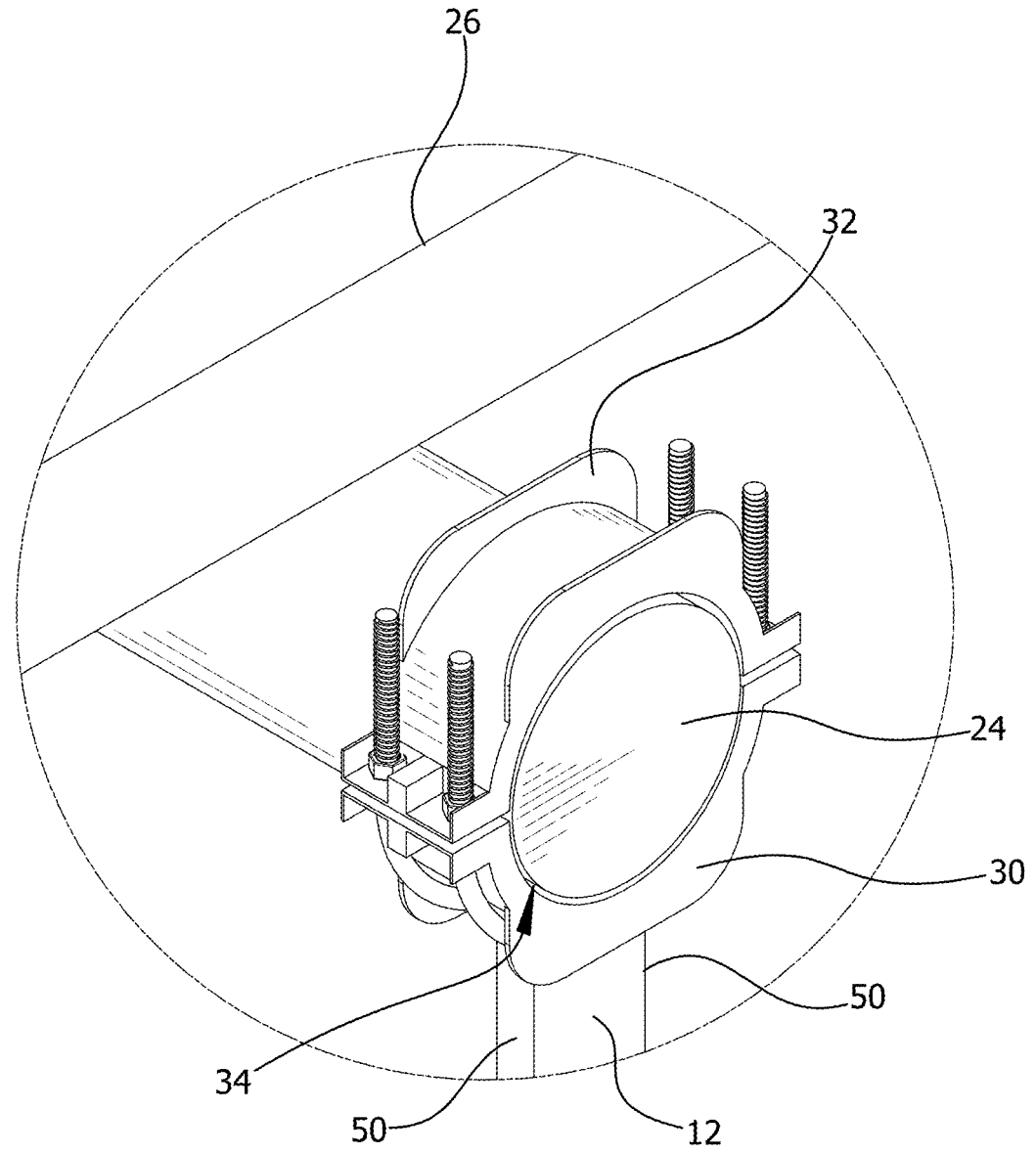
FIG. 6 is a detail view of an embodiment of the disclosure.
Figure 7:
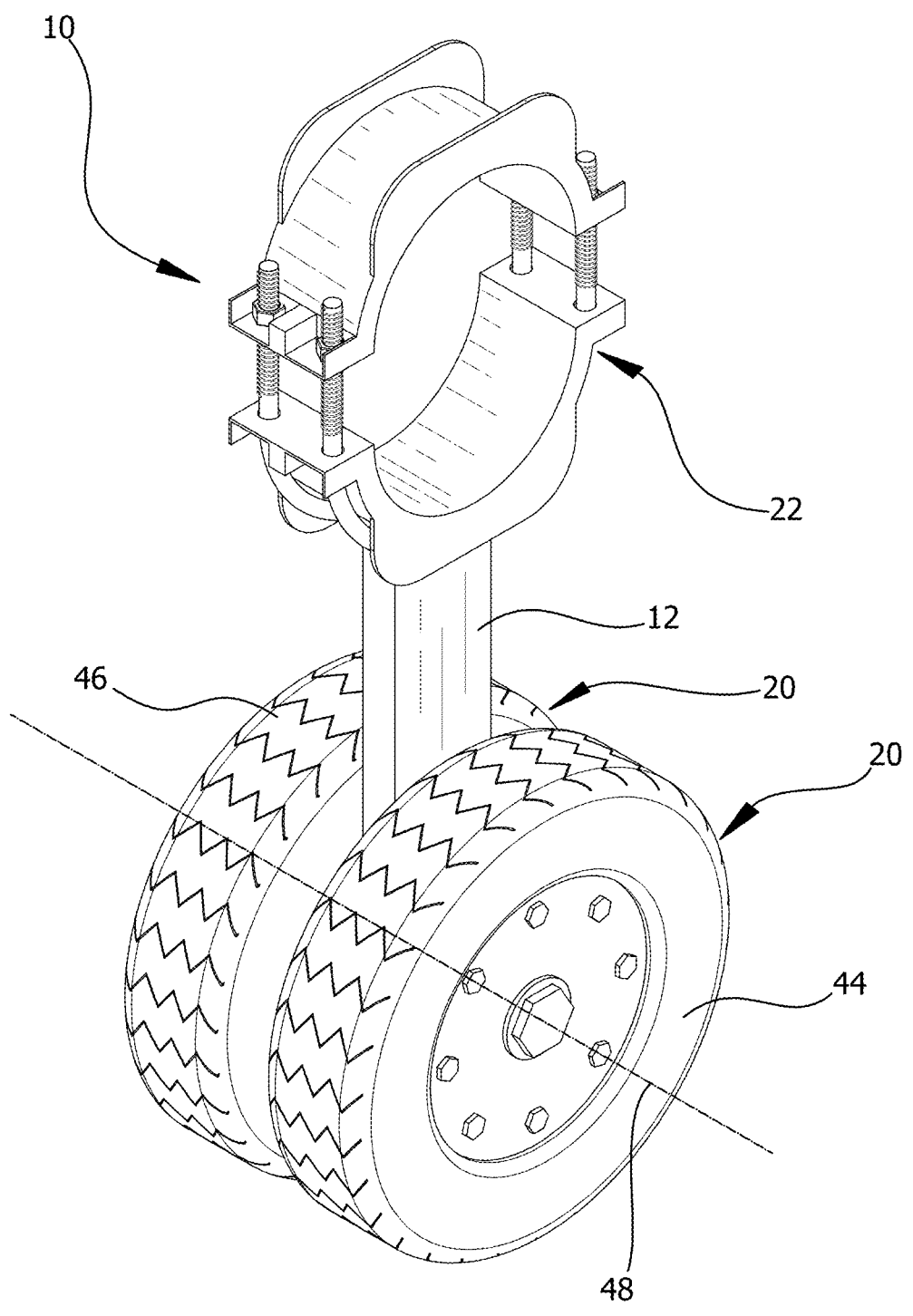
FIG. 7 is a perspective view of an embodiment of the disclosure.

A second coupling member 32 may be removably engageable with the first coupling member 30. For example, the second coupling member 32 may define a U-shape wherein the second coupling member 32 is positionable relative to the first coupling member 30 to define a channel 34 that is configured to receive the axle 24 of the vehicle 26. The channel 34 may be parallel to the first side of the pair of opposing sides 18 of the shaft 12 wherein the shaft 12 is configured to be perpendicular to the axle 24 of the vehicle 26. The second coupling member 32 may be vertically spaced from the first coupling member 30 while the axle 24 is positioned within the channel 34, as shown in FIG. 6, to inhibit the axle 24 from pivoting the shaft 12 while the vehicle 26 is being moved. In other words, the channel 34 may be spaced from the axle 24 while the shaft 12 is secured to the axle 24 via the coupler 22.

A plurality of apertures 36 may extend through the first coupling member 30. Each aperture of the plurality of apertures 36 may be perpendicular to the first side of the pair of opposing sides 18 of the shaft 12. A plurality of holes 38 may extend through the second coupling member 32. Each hole of the plurality of holes may be perpendicular to the first side of the pair of opposing sides 18 of the shaft 12. Each hole of the plurality of holes 38 is generally alignable with an associated aperture of the plurality of apertures 36 while the second coupling member 32 is engaged with the first coupling member 30.

A plurality of fasteners 40 may be positioned within the plurality of apertures 36. More specifically, the plurality of fasteners 40 may extend upwardly from the first coupling member 30. The plurality of fasteners 40 are generally positionable within the plurality of holes 38 to engage the second coupling member 32 with the first coupling member 30. The plurality of fasteners 40 may be parallel to the first side of the pair of opposing sides 18 of the shaft 12. Each fastener of the plurality of fasteners 40 may be a bolt, although alternative fasteners are also contemplated.

A plurality of retainers 42 is removably couplable to the plurality of fasteners 40. For example, the plurality of retainers 42 may be coupled to the plurality of fasteners 40 while the plurality of fasteners 40 are positioned within the plurality of holes 38. The plurality of retainers 42 secure the second coupling member 32 to the first coupling member 30. Each retainer of the plurality of retainers 42 may be a nut, although alternative retainers are also contemplated.

In some embodiments, the wheel 20 may be a first wheel 44 that is coupled to the shaft 12. The support wheel assembly 20 may further comprise a second wheel 46 that is also rotatably coupled to the shaft 12. The first wheel 44 and the second wheel 46 are configured to increase a maximum weight that is supportable by the shaft 12 and the wheel 20. In other words, embodiments according to FIGS. 1-6 may be preferred when the support wheel assembly 10 is used to support and move a lighter weight vehicle 26, such as the trailer shown in FIG. 5. Embodiments according to FIG. 7 that have both the first wheel 44 and the second wheel 46 may be preferred when supporting and moving a heavier vehicle 26, such as a large camper.

The first wheel 44 and the second wheel 46 may be concentrically positioned relative to each other whereby each of the first wheel 44 and the second wheel 46 rotate about a common axis 48. For example, the shaft 12 may be positioned between the first wheel 44 and the second wheel 46. The common axis 48 may extend through the shaft 12 perpendicularly to the pair of opposing sides 18 of the shaft 12.

In use, the immobile wheel 28 may be removed from the axle 24 of the vehicle 26. The first coupling member 30 may be positioned beneath the axle 24 of the vehicle 26. The second coupling member 32 may be positioned over the axle 24 of the vehicle 26 such that the first coupling member 30 and the second coupling member 32 define the channel 34 around the axle 24 of the vehicle 26. The wheel 20 attached to the shaft 12 is then positioned beneath the vehicle 26, in place of the immobile wheel 28, to facilitate movement of the vehicle 26. The shaft 12 and the coupler 22 may be made from the iron material that is strong enough to support the vehicle 26 without bending, breaking, or otherwise deforming under the weight of the vehicle 26.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A support wheel assembly comprising:
a shaft having a bottom end and a top end;
a wheel being rotatably coupled to the shaft, the wheel being positioned adjacent to the bottom end of the shaft;
a coupler being coupled to the top end of the shaft wherein the coupler is configured to releasably secure the shaft to an axle of a vehicle wherein the shaft is configured to position the wheel beneath the vehicle to facilitate movement of the vehicle when the vehicle has an immobile wheel; and

the coupler further comprising:

a first coupling member being attached to the top end of the shaft, the first coupling member defining a U-shape; and a second coupling member being removably engageable with the first coupling member, the second coupling member defining a U-shape wherein the second coupling member is positionable relative to the first coupling member to define a channel being configured to receive the axle of the vehicle.

2. The support wheel assembly of claim 1, the shaft further comprising a pair of opposing sides, the channel being parallel to the pair of opposing sides of the shaft wherein the shaft is configured to be perpendicular to the axle of the vehicle while the shaft is releasably secured to the axle.

3. The support wheel assembly of claim 2, wherein the wheel is positioned on a first side of the pair of opposing sides of the shaft.

4. The support wheel assembly of claim 3, wherein the wheel is parallel to the first side of the pair of opposing sides of the shaft.

5. The support wheel assembly of claim 1, the coupler further comprising:

a plurality of apertures extending through the first coupling member;

a plurality of holes extending through the second coupling member; and a plurality of fasteners being positioned within the plurality of apertures wherein the plurality of fasteners extend upwardly from the first coupling member, the plurality of fasteners being positionable within the plurality of holes to engage the second coupling member with the first coupling member.

6. The support wheel assembly of claim 5, the coupler further comprising a plurality of retainers being removably couplable to the plurality of fasteners while the plurality of fasteners are positioned within the plurality of holes wherein the plurality of retainers secure the second coupling member to the first coupling member.

7. A support wheel assembly comprising:

a shaft having a bottom end and a top end, the shaft having a pair of opposing sides, each opposing side of the pair of opposing sides being planar, the shaft being rectangular wherein the shaft is elongated between the bottom end and the top end;

a wheel being rotatably coupled to the shaft, the wheel being positioned adjacent to the bottom end of the shaft, the wheel being positioned on a first side of the pair of opposing sides of the shaft, the wheel being parallel to the first side of the pair of opposing sides; and

a coupler being coupled to the top end of the shaft wherein the coupler is configured to releasably secure the shaft to an axle of a vehicle wherein the shaft is configured to position the wheel beneath the vehicle to facilitate movement of the vehicle when the vehicle has an immobile wheel, the coupler including:

a first coupling member being attached to the top end of the shaft, the first coupling member extending outwardly from opposing lateral ends of the shaft wherein the first coupling member defines a U-shape;

a second coupling member being removably engageable with the first coupling member, the second coupling member defining a U-shape wherein the second coupling member is positionable relative to the first coupling member to define a channel being configured to receive the axle of the vehicle, the channel being parallel to the first side of the pair of opposing sides of the shaft wherein the shaft is configured to be perpendicular to the axle of the vehicle;

a plurality of apertures extending through the first coupling member, each aperture of the plurality of apertures being perpendicular to the first side of the pair of opposing sides of the shaft;

a plurality of holes extending through the second coupling member, each hole of the plurality of holes being perpendicular to the first side of the pair of opposing sides of the shaft;

a plurality of fasteners being positioned within the plurality of apertures wherein the plurality of fasteners extend upwardly from the first coupling member, the plurality of fasteners being positionable within the plurality of holes to engage the second coupling member with the first coupling member, the plurality of fasteners being parallel to the first side of the pair of opposing sides of the shaft; and a plurality of retainers being removably couplable to the plurality of fasteners while the plurality of fasteners are positioned within the plurality of holes wherein the plurality of retainers secure the second coupling member to the first coupling member.

8. The support wheel assembly of claim 7, wherein the wheel is a first wheel being coupled to the shaft, the support wheel assembly further comprising a second wheel being coupled to the shaft.

9. The support wheel assembly of 8, wherein the first wheel and the second wheel are concentrically positioned relative to each other whereby each of the first wheel and the second wheel rotate about a common axis.

10. The support wheel assembly of 8, wherein the shaft is positioned between the first wheel and the second wheel and wherein the common axis extends through the shaft perpendicularly to the pair of opposing sides of the shaft.

* * * * *